United States Patent
Sato

(10) Patent No.: US 9,288,740 B2
(45) Date of Patent: Mar. 15, 2016

(54) COMMUNICATION APPARATUS, CONTROL METHOD FOR THE SAME, COMMUNICATION SYSTEM, AND NON-TRANSITORY COMPUTER-READABLE STORAGE MEDIUM

(71) Applicant: CANON KABUSHIKI KAISHA, Tokyo (JP)

(72) Inventor: Ryosuke Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/669,549

(22) Filed: Mar. 26, 2015

(65) Prior Publication Data

US 2015/0289194 A1 Oct. 8, 2015

(30) Foreign Application Priority Data

Apr. 3, 2014 (JP) ................................. 2014-077258
Oct. 31, 2014 (JP) ................................. 2014-223192

(51) Int. Cl.
H04W 4/00 (2009.01)
H04W 40/22 (2009.01)

(52) U.S. Cl.
CPC .............. *H04W 40/22* (2013.01); *H04W 4/008* (2013.01)

(58) Field of Classification Search
CPC .............................. H04W 40/22; H04W 4/008
See application file for complete search history.

(56) References Cited

U.S. PATENT DOCUMENTS

| | | | | |
|---|---|---|---|---|
| 2010/0034083 A1* | 2/2010 | Prakash | ............... | H04W 28/18 370/230.1 |
| 2012/0238287 A1* | 9/2012 | Scherzer | ............... | H04W 48/16 455/456.1 |
| 2014/0135036 A1* | 5/2014 | Bonanni | ............... | H04W 4/023 455/456.3 |
| 2014/0141715 A1* | 5/2014 | Smith | .................. | H04B 5/0075 455/41.1 |

FOREIGN PATENT DOCUMENTS

| | | |
|---|---|---|
| JP | 2006-311137 A | 11/2006 |
| JP | 2011-039793 A | 2/2011 |

* cited by examiner

*Primary Examiner* — Clemence Han
(74) *Attorney, Agent, or Firm* — Carter, DeLuca, Farrell & Schmidt, LLP

(57) ABSTRACT

A communication apparatus capable of relaying communication between an external apparatus and a communication terminal, determines whether or not a wireless network that enables connection to the external apparatus exists, and decides on a communication mode between the external apparatus and the communication terminal according to a wireless network that was determined as being connectable.

13 Claims, 13 Drawing Sheets

F I G. 2
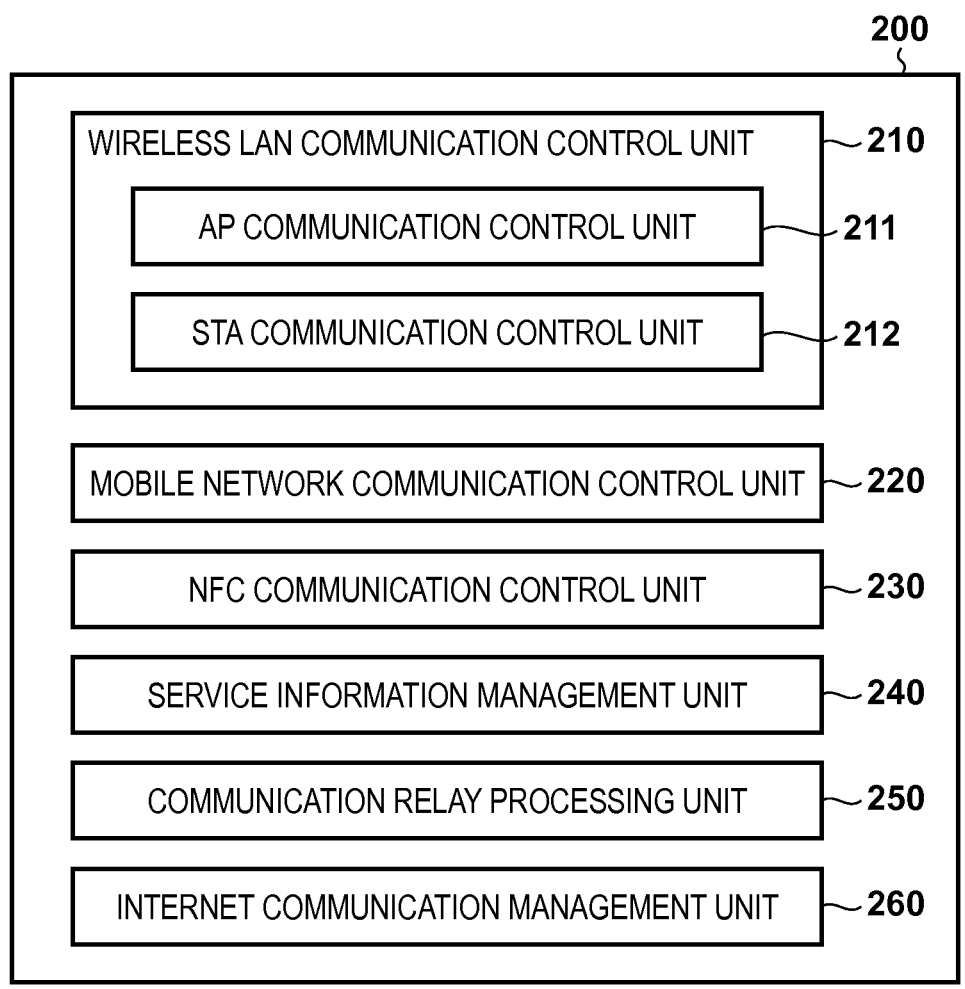

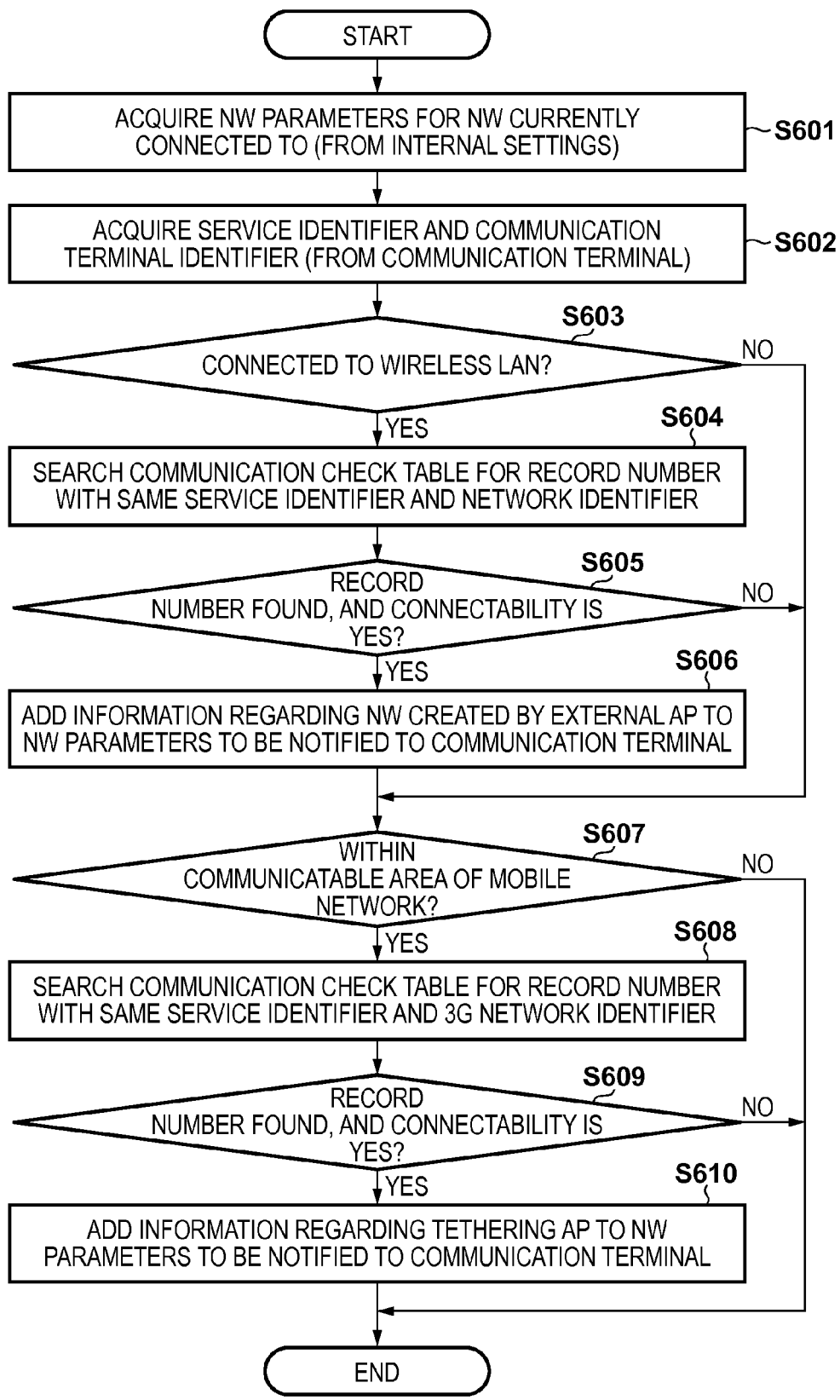

FIG. 7

COMMUNICATION CHECK TABLE 700

| RECORD NO. | SERVICE IDENTIFIER | SERVER | NETWORK IDENTIFIER | CONNECTABILITY |
|---|---|---|---|---|
| 1 | XXX CAMERA SERVICE | https://XXX.co.jp/ | MOBILE NETWORK | YES |
| 2 | XXX CAMERA SERVICE | https://XXX.co.jp/ | Wi-Fi(BSSID:AAA) | YES |
| 3 | XXX CAMERA SERVICE | https://XXX.co.jp/ | Wi-Fi(BSSID:BBB) | NO |
| 4 | YYY CAMERA SERVICE | https://YYY.co.jp/ | MOBILE NETWORK | YES |
| 5 | YYY CAMERA SERVICE | https://YYY.co.jp/ | Wi-Fi(BSSID:BBB) | NO |
| 6 | ZZZ PRINTER SERVICE | https://ZZZ.co.jp/ | MOBILE NETWORK | NO |
| 7 | ZZZ PRINTER SERVICE | https://ZZZ.co.jp/ | Wi-Fi(BSSID:AAA) | NO |
| 8 | ZZZ PRINTER SERVICE | https://ZZZ.co.jp/ | Wi-Fi(BSSID:BBB) | YES |
| 9 | | | | |

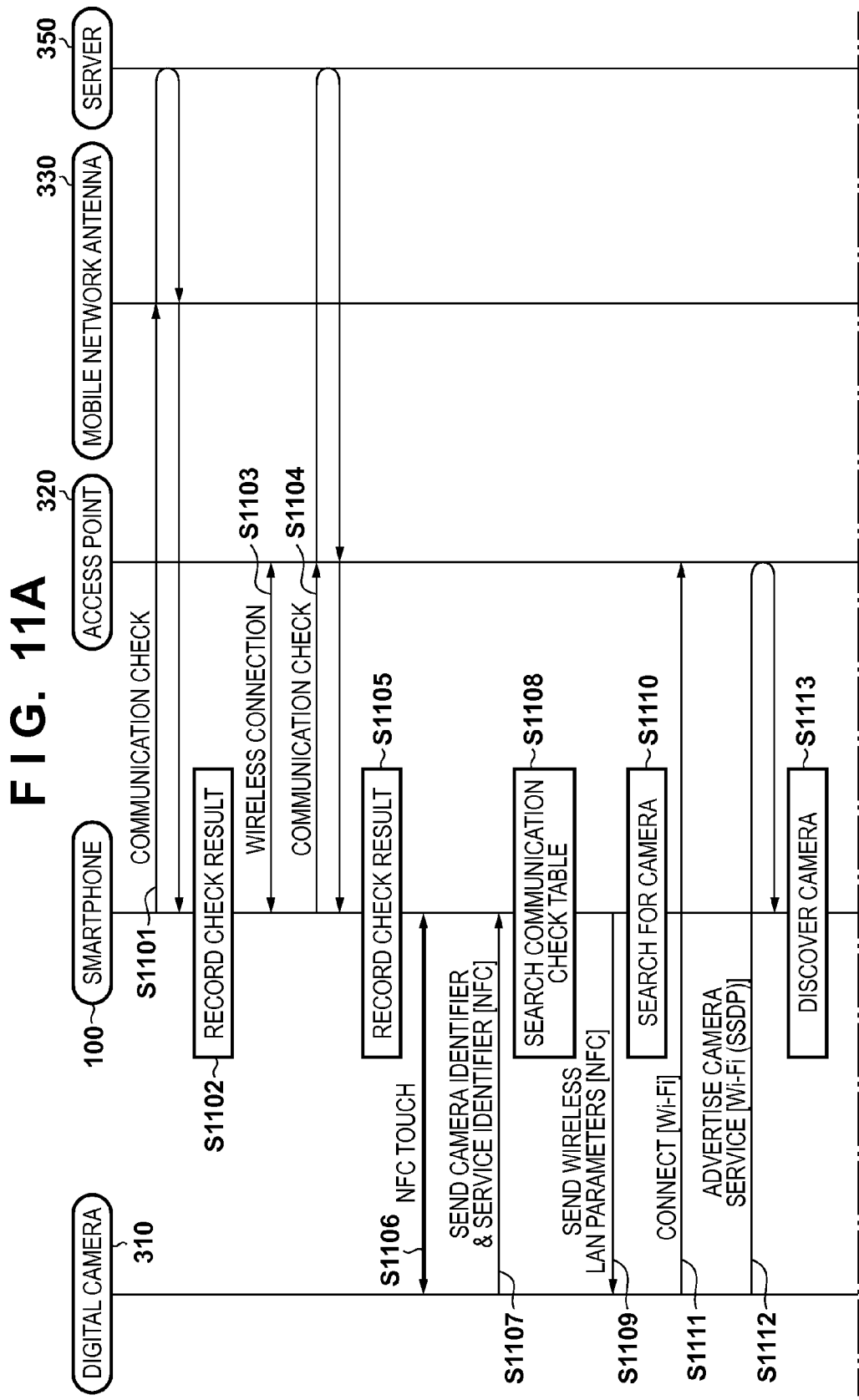

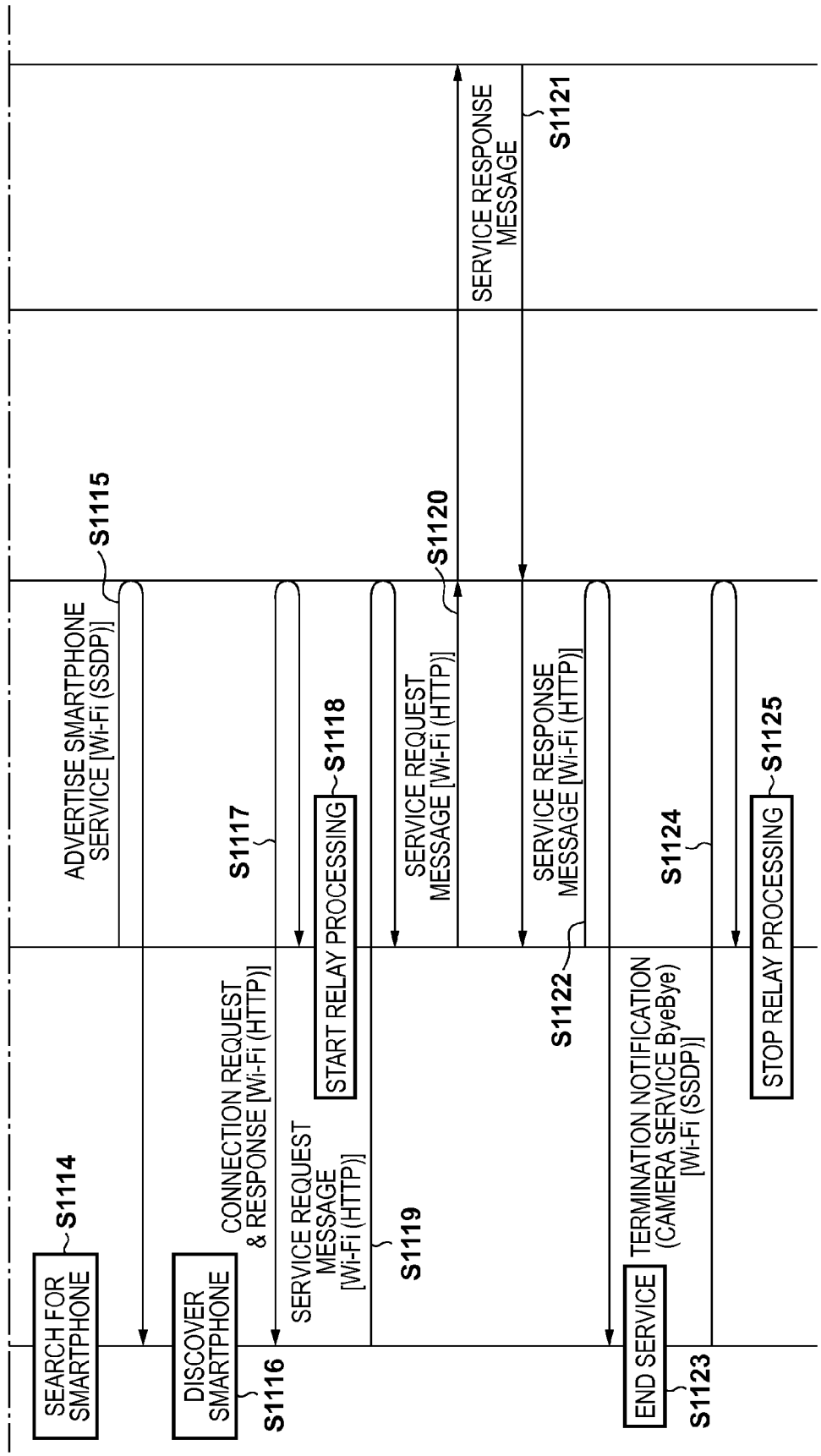

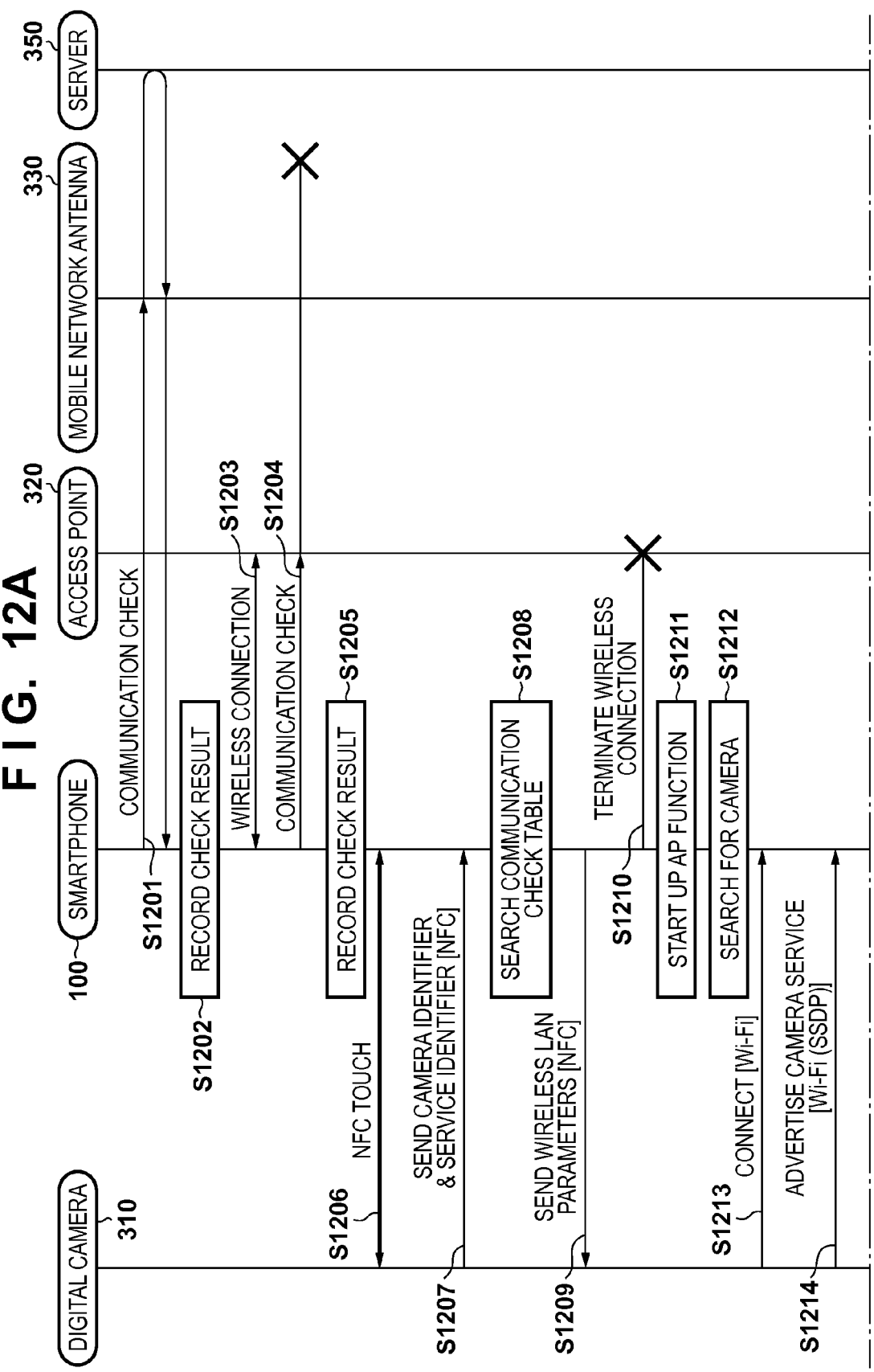

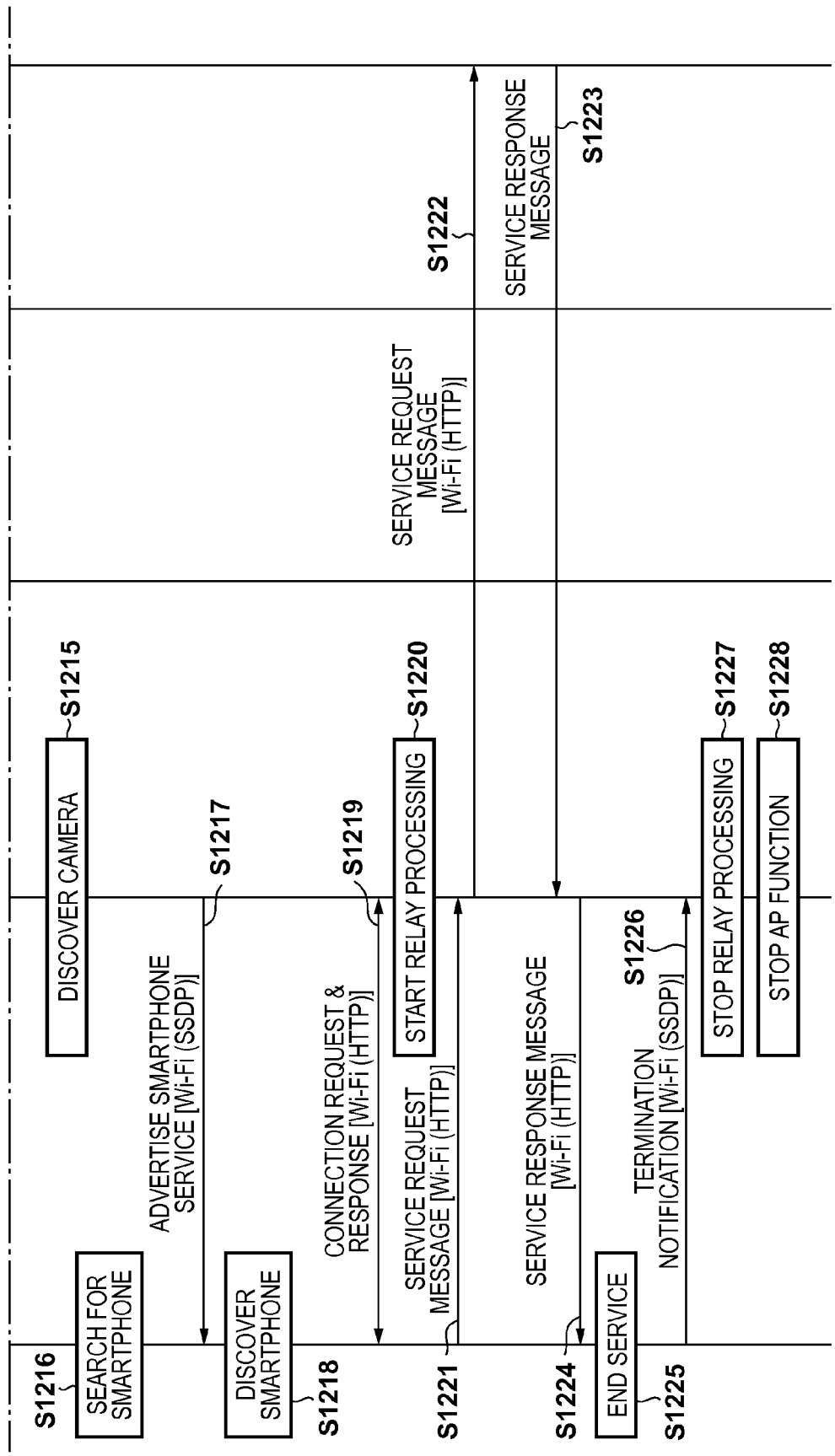

COMMUNICATION APPARATUS, CONTROL METHOD FOR THE SAME, COMMUNICATION SYSTEM, AND NON-TRANSITORY COMPUTER-READABLE STORAGE MEDIUM

BACKGROUND OF THE INVENTION

1. Field of the Invention

The present invention relates to a communication apparatus that has multiple communication interfaces and relays service processing exchanged between an external communication terminal and an external server, as well as a control method for the same, a communication system, and a non-transitory computer-readable storage medium.

2. Description of the Related Art

In recent years, among mobile phone terminals typified by smartphones, there are many terminals that are equipped with a wireless LAN function and can communicate with other devices equipped with a wireless LAN function. A function called "tethering", in which one communication terminal operates as a wireless LAN access point in order to operate as a modem for another communication terminal, has also become prevalent. A system has been disclosed in which, by using these functions, a camera performs cloud service authentication processing via a smartphone operating as a relay apparatus (Japanese Patent Laid-Open No. 2011-39793).

Also, several connection modes are conceivable when wireless LAN communication is performed between communication terminals. Examples of conceivable connection modes include a mode of connection via an external AP (Access Point), a mode in which one communication terminal operates as the AP and the other communication terminal connects to that AP, and a so-called ad hoc communication mode of connection to a network without an AP. Japanese Patent Laid-Open No. 2006-311137 discloses a technique in which, when one terminal is to start communication with a partner terminal, the one terminal determines which communication mode is to be used for communication in the surrounding wireless environment, and notifies the partner terminal of communication parameters corresponding to the respective connection modes. There is also a technique in which communication parameters for connection using a wireless LAN are notified to the connection partner using a different communication interface such as Near Field Communication (NFC), thus simplifying wireless LAN setting and connection processing.

In light of the above background, consider a system in which during communication between a smartphone and a communication terminal (e.g., a digital camera) using a wireless LAN, the smartphone operates as the relay apparatus, and a server located in an external network performs communication with the communication terminal, as in Japanese Patent Laid-Open No. 2011-39793.

The communication modes between the smartphone and the server can be mainly divided into two modes, namely a mode of connection via an external wireless LAN AP and a mode of connection via an antenna and base station in a mobile network. In many smartphones, the connection mode for connection between the smartphone and the communication terminal using a wireless LAN is limited by the communication mode for communication between the smartphone and the server. In general, in the case where the smartphone and the server are to be connected to each other via an external wireless LAN AP, the smartphone and the communication terminal need to be connected to each other via the same wireless LAN AP. On the other hand, if the smartphone and the server are to be connected to each other via a mobile network, the smartphone and the communication terminal need to be connected to each other without going through the external wireless LAN AP.

Now consider a method in which the smartphone determines the wireless LAN connection mode, and notifies the communication terminal of communication parameters using NFC according to the above-described techniques. In this case, the smartphone notifies the communication terminal of communication parameters of the network created by the external wireless LAN AP or communication parameters of the network to be created when the smartphone operates as an AP, or both of them. The communication terminal then connects to the designated network using the notified communication parameters, and performs communication with the smartphone. As described above, the connection mode that can be used between the smartphone and the communication terminal in this system is dependent on the connection mode for connection between the smartphone and the server. For this reason, it is desirable to prevent the communication terminal from connecting to a network that cannot be actually used, by causing the smartphone to notify the communication terminal of only communication parameters of the network that corresponds to the connection mode that can be used for communication with the partner server, for example.

Japanese Patent Laid-Open No. 2006-311137 discloses a technique for determining the connection mode of the network to be formed with another terminal in the surrounding wireless environment. Considering the case where the technique disclosed in Japanese Patent Laid-Open No. 2006-311137 is applied to the aforementioned system, connectivity with the device at a higher position above the AP (connectivity with the server or the like) is not taken into account in Japanese Patent Laid-Open No. 2006-311137. For this reason, there is concern that even if the AP is not connected to the external network, for example, the communication terminal will be notified of that AP's communication parameters, thus resulting in connection in a mode in which the communication terminal and the server cannot communicate with each other.

SUMMARY OF THE INVENTION

The present invention has been achieved in light of the above-described problems, and enables realization of a technique for reducing the occurrence of unnecessary connection processing between a relay apparatus and a communication terminal.

According to one aspect of the present invention, there is provided a communication apparatus capable of relaying communication between an external apparatus and a communication terminal, which comprises a determination unit configured to determine whether or not a wireless network that enables connection to the external apparatus exists; and a decision unit configured to decide on a communication mode between the external apparatus and the communication terminal according to a wireless network that the determination unit determined enables connection.

Further features of the present invention will become apparent from the following description of exemplary embodiments with reference to the attached drawings.

BRIEF DESCRIPTION OF THE DRAWINGS

FIG. 2 is a diagram showing an example of a function block configuration of the relay apparatus according to the first embodiment.

FIG. 6 is a diagram illustrating an operation flow when the relay apparatus acquires communication parameters according to the first embodiment.

FIG. 7 is a diagram showing an example of a format of a communication check table of the relay apparatus according to the first embodiment.

FIGS. 11A to 11B are diagrams (part 1) illustrating an example of a communication sequence between the relay apparatus, the communication terminal, and a server according to the first embodiment.

FIGS. 12A to 12B are diagrams (part 2) illustrating an example of a communication sequence between the relay apparatus, the communication terminal, and the server according to the first embodiment.

DESCRIPTION OF THE EMBODIMENTS

First Embodiment

Figure 1:
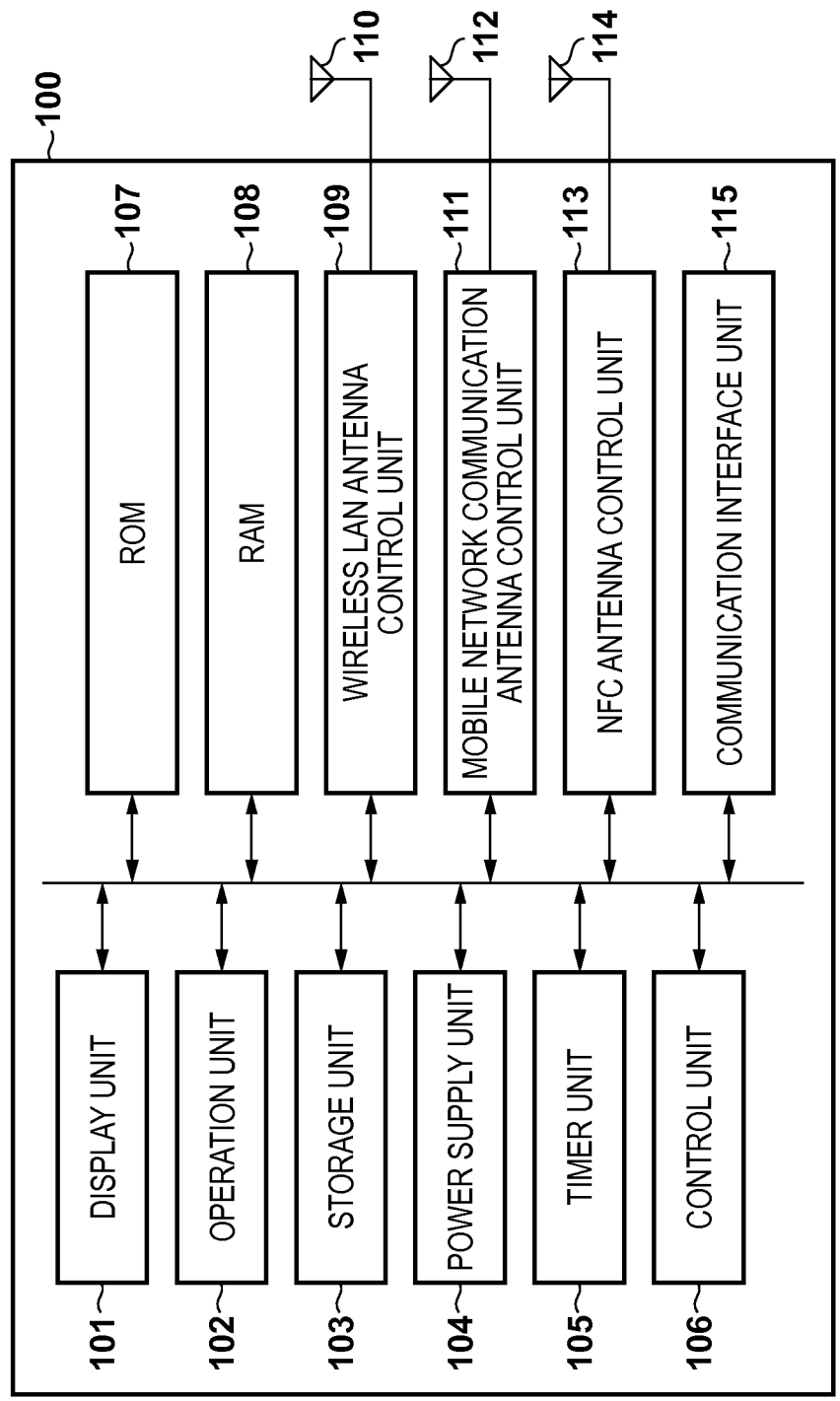
FIG. 1 is a diagram showing an example of a hardware configuration of a relay apparatus according to a first embodiment.

Hereinafter, a relay apparatus and a communication terminal according to the present embodiment will be described in detail with reference to the drawings. FIG. 1 is a diagram showing the hardware configuration of the relay apparatus according to the present embodiment. A relay apparatus 100 includes a display unit 101, an operation unit 102, a storage unit 103, a power supply unit 104, a timer unit 105, a control unit 106, a ROM 107, a RAM 108, a wireless LAN antenna control unit 109, and a wireless LAN antenna 110. The relay apparatus 100 further includes a mobile network communication antenna control unit 111, a mobile network communication antenna 112, an NFC antenna control unit 113, an NFC antenna 114, and a communication interface unit 115.

The display unit 101 and the operation unit 102 display applications and execute applications, for example. The storage unit 103 stores and manages various types of data such as wireless communication network information, data exchange information, and communication device information. The power supply unit 104 is a battery or the like. The timer unit 105 functions as a timer for measuring time. The control unit 106 is a CPU or the like, and controls operation of the constituent elements of the relay apparatus 100. The ROM 107 stores control commands, that is to say, programs. The RAM 108 is used as a work memory when programs are executed, and also for the temporary storage of data, for example. The wireless LAN antenna control unit 109 controls the wireless LAN antenna 110. The mobile network communication antenna control unit 111 controls the mobile network communication antenna 112. The NFC antenna control unit 113 controls the NFC antenna 114. The communication interface unit 115 is an interface for performing communication processing such as network searching, construction, connection, and management.

FIG. 2 is a function block diagram of the relay apparatus of the present embodiment. In the present embodiment, the function blocks of the relay apparatus 200 are stored as programs in the ROM 107, and the corresponding functions are implemented by the control unit 106 executing these programs. Note that some or all of the function blocks of the relay apparatus 200 may be realized by hardware. The relay apparatus 200 includes a wireless LAN communication control unit 210, a mobile network communication control unit 220, an NFC communication control unit 230, a service information management unit 240, a communication relay processing unit 250, and an Internet communication management unit 260.

The wireless LAN communication control unit 210 controls wireless LAN communication performed via the wireless LAN antenna 110 and the wireless LAN antenna control unit 109. Also, the wireless LAN communication control unit 210 includes an AP communication control unit 211 and an STA communication control unit 212. The AP communication control unit 211 controls wireless LAN communication performed by the relay apparatus operating as an access point, and the STA communication control unit 212 controls wireless LAN communication performed by connecting to an external access point. The mobile network communication control unit 220 controls mobile network communication performed via the mobile network communication antenna 112 and the mobile network communication antenna control unit 111. Note that this mobile network communication refers to communication compliant with Wideband Code Division Multiple Access (W-CDMA) specifications and Long Term Evolution (LTE) specifications. The NFC communication control unit 230 controls Near Field Communication (NFC) communication performed via the NFC antenna 114 and the NFC antenna control unit 113. The service information management unit 240 manages information regarding services available to the communication terminal.

The service information management unit 240 manages services available to the communication terminal along with the addresses of servers corresponding to the services. The service information management unit 240 also uses a later-described communication check table to manage connectability information that associates each server with a wireless network. The communication relay processing unit 250 can, in cooperation with the wireless LAN communication control unit 210 and the mobile network communication control unit 220, relay communication processing between a communication terminal located in a local network and a server located in an external network. The communication relay processing unit 250 relays service processing performed between the communication terminal and the server, in accordance with information managed by the service information management unit 240. The Internet communication management unit 260 performs control for the execution of communication by the relay apparatus 200 using the Internet. The Internet communication management unit 260 performs Internet connection using either the STA communication control unit 212 or the mobile network communication control unit 220, in accordance with the surrounding wireless environment, a user setting, and the like.

Figure 3:
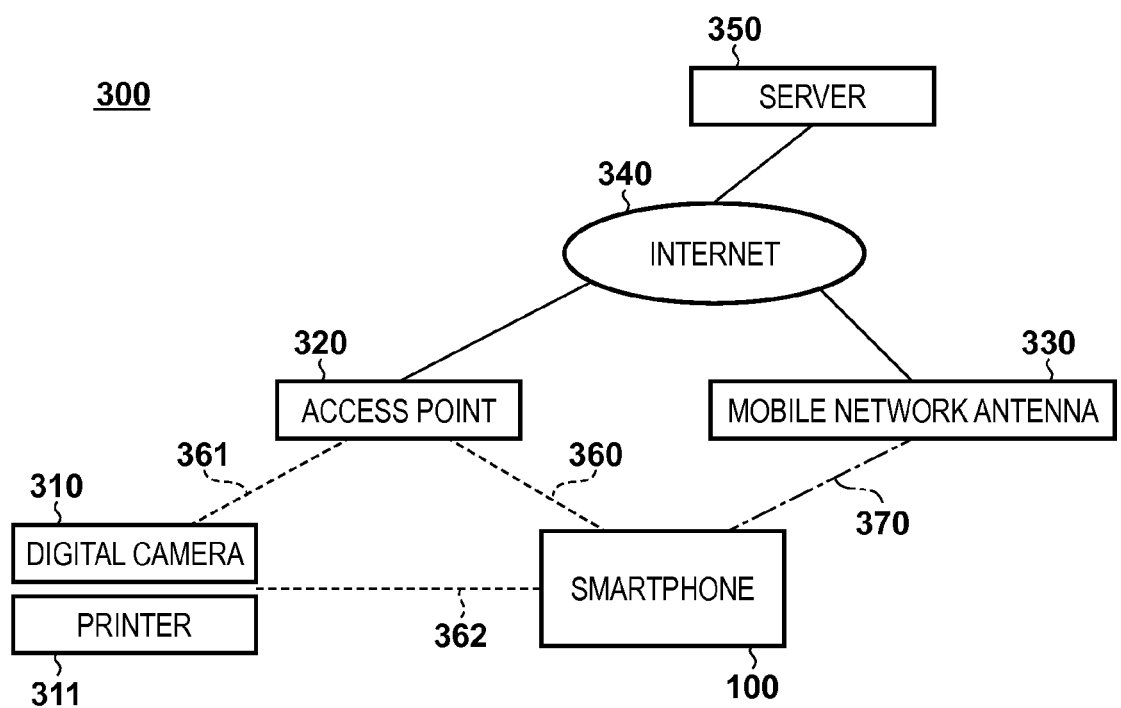
FIG. 3 is a diagram showing an example of a configuration of a system according to the first embodiment.

FIG. 3 is a diagram showing an example of the configuration of a system according to the present embodiment. Note that although the relay apparatus will be described as being a smartphone in the present embodiment, it may be another apparatus as long as it has the configuration shown in FIGS. 1 and 2. Also, although the communication terminal will be described as being a digital camera or a printer in the present embodiment, it may be another apparatus as long as it has the configuration shown in FIGS. 8 and 9 that will be described later.

In a communication system 300, a smartphone 100, which is the relay apparatus, can connect to the Internet 340 via an access point 320 and a mobile network antenna 330. A server 350 can connect to the Internet 340. The smartphone 100 can also communicate with a digital camera 310 and a printer 311, which are communication terminals, using a wireless LAN. Dashed lines 360 to 362 indicate a wireless LAN communication connection mode. The dashed lines 360 and 361 indicate that the smartphone 100, the digital camera 310, and the printer 311 are connected to the access point 320. Also, the dashed line 362 indicates that the smartphone 100, the digital camera 310, and the printer 311 can perform wireless LAN communication directly with each other, without going through the external access point 320. In this case, the smartphone 100 operates as the AP, and the digital camera 310 and the printer 311 connect to the smartphone 100 as wireless LAN terminals (STAs). Also, a dashed-dotted line 370 indicates that the smartphone 100 can communicate with the mobile network antenna 330 using mobile network communication specifications.

Next, the communication check table managed by the relay apparatus (smartphone 100) of the present embodiment will be described with reference to FIG. 7. Note that this table is managed by the service information management unit 240. A communication check table 700 is a table in which connectability information regarding servers separately managed by the service information management unit 240 is managed in association with information regarding networks that were connected to when the smartphone 100 performed connectability checking. The communication check table 700 can include a service identifier 701, a server 702, a network identifier 703, and a connectability 704 as information elements. Also, each set of these information elements is associated with one record number 705.

The service identifier 701 is an identifier that uniquely identifies a service that a server can provide. The server 702 is the Uniform Resource Locator (URL) information of the server that corresponds to the service indicated by the service identifier 701, and one or more URLs are associated with each service identifier. The network identifier 703 indicates the type of network (mobile network communication or wireless LAN), and the Basic Service Set Identifier (BSSID) of the wireless LAN network. Network information obtained when connectability checking is performed for the server 702 is recorded as the network identifier 703, and the ability (YES) or inability (NO) to establish a connection, which is the result of the check, is recorded as the connectability 704.

The communication check table 700 in FIG. 7 indicates that, for example, as a result of the smartphone 100 checking the ability to connect to the server at https://XXX.co.jp in the case of XXX camera service, it was confirmed that connection was possible via the mobile network and the AP with BSSID=AAA, and connection was not possible via the AP with BSSID=BBB.

Next, operation procedures of the relay apparatus (smartphone 100) of the present embodiment will be described with reference to the flowcharts in FIGS. 4, 5, and 6.

Figure 4:
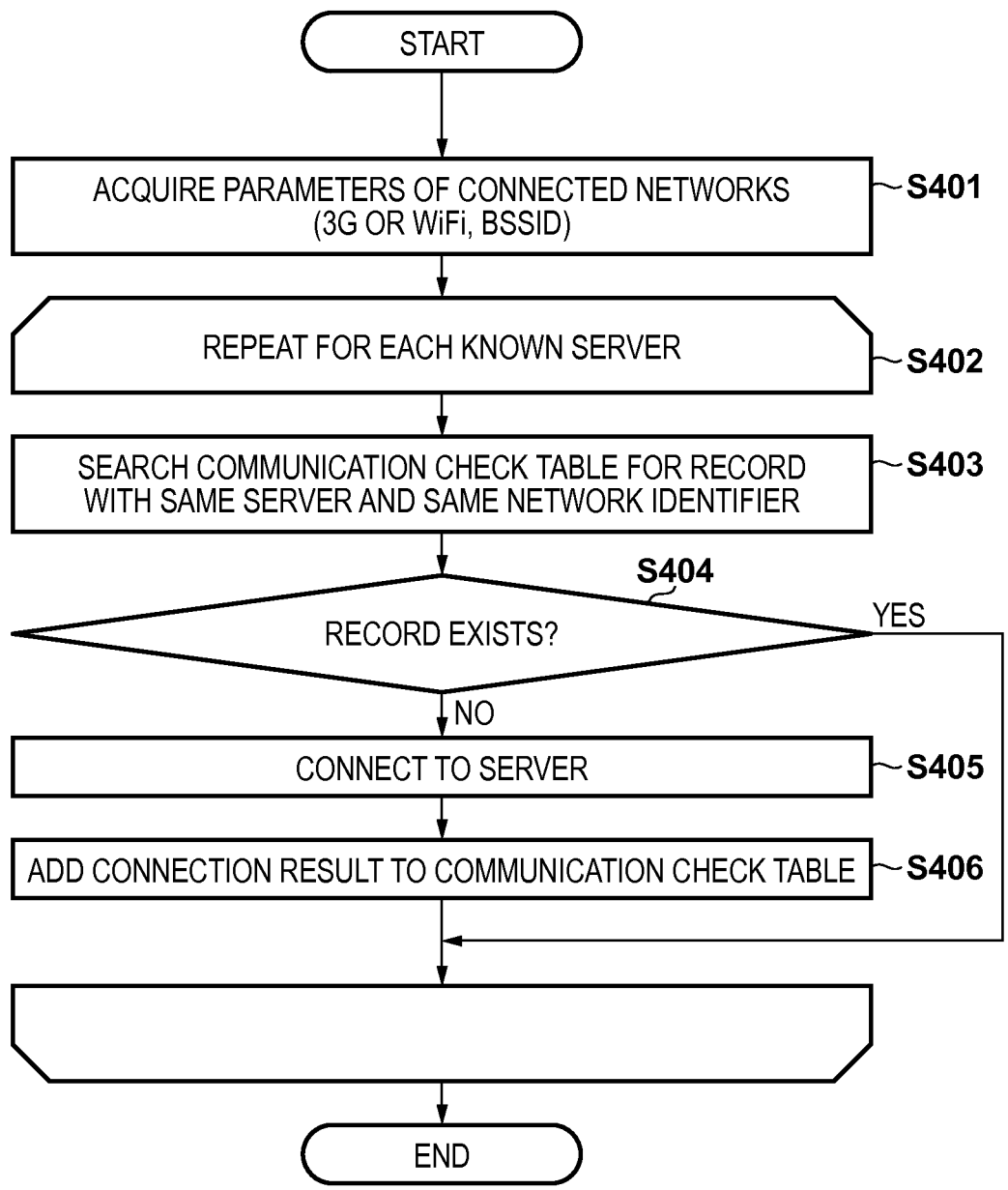
FIG. 4 is a diagram illustrating an operation flow when the relay apparatus determines whether or not communication with a server is possible according to the first embodiment.

FIG. 4 shows an operation procedure when communicatability with a server is determined by the relay apparatus (smartphone 100) of the present embodiment. In the present embodiment, this processing is carried out when the smartphone 100 serving as the relay apparatus starts up an application, and when there is a change in the destination network in wireless LAN communication performed via the STA communication control unit 212. Note that this processing may be carried out at other timings, such as being periodically carried out at a constant time interval.

First, the smartphone 100 acquires the parameters of the network that it is connected to at the start of this processing (the network type (wireless LAN or mobile network) and the network identifier (BSSID)) from the Internet communication management unit 260 (step S401). Next, the smartphone 100 repeats the processing of steps S403 to S406 for each server managed by the service information management unit 240 (step S402). First, the smartphone 100 searches the communication check table 700 for a record number 705 whose server 702 and network identifier 703 respectively match the target server and the BSSID acquired in step S401. If a record number 705 having these two matching information elements exists (Yes in step S404), the smartphone 100 then performs the same search processing for the next server. If a record number 705 having these two matching information elements does not exist (No in step S404), the smartphone 100 performs a connection check with respect to the server (step S405). The smartphone 100 then stores the check result (704), the URL of the server (702), the network parameters acquired in step S401 (703), and the service type that corresponds to the server (701) in association with a record number (705) in the communication check table 700 (step S406).

In the present embodiment, in the connection check performed in step S405, the smartphone 100 transmits a Hyper Text Transfer Protocol (HTTP) request message to the URL of the server managed by the service information management unit 240, and checks whether or not a response message is returned normally. However, the means for determining communicatability with the server is not limited to this. For example, the smartphone 100 may perform a communication check using a protocol other than HTTP (such as Ping).

Also, the smartphone 100 may determine that communication with the server is possible if the address of at least either the gateway server (not shown) or the Domain Name Service (DNS) server (not shown) was notified of by the connected access point (e.g., the access point 200). Furthermore, the smartphone 100 may determine that communication with the server is possible if the addresses of both the gateway server and the DNS server were notified of by the connected access point. In general, the gateway server and the DNS server are connected to the Internet, and therefore it is possible to check the connection between the access point 320 and the Internet 340 using the above-described methods. Accordingly, in an environment in which the fact that the server 350 is connected to the Internet 340 can be trusted, the connection between the smartphone 100 and the server 350 can be checked using the above-described methods.

Also, the smartphone 100 may determine that communication with the server is possible if an IP address has been allocated to it by the Dynamic Host Configuration Protocol (DHCP) protocol. In an environment in which communication between the access point and the router connected to the Internet is unstable, the above-described method is also effective as a determination method.

Also, the smartphone 100 may determine that communication with the server is possible if the smartphone 100 is connected to an access point that has been registered in advance by the user (e.g., the access point 200). It can be determined whether or not the access point is an access point that has been registered by the user based on whether or not there is a match with a Basic Service Set Identifier (BSSID) or a Service Set Identifier (SSID) set by the user in advance. For example, if the access point is the user's home access point, it is clear to the user that the access point is connected to the Internet and the server, and therefore the connection between the smartphone 100 and the server 350 can be checked by the above-described method.

The above are examples of determining means by which the relay apparatus (smartphone 100) of the present invention determines connectability with an external apparatus (server 350). Furthermore, the smartphone 100 may determine communicatability with the server using a combination of the above-described determination methods. The details of the determination method are not limited in the present invention as long as it is a method by which the smartphone 100 or the user thereof can determine that the smartphone 100 and the server 350 can be connected to each other.

Figure 5:
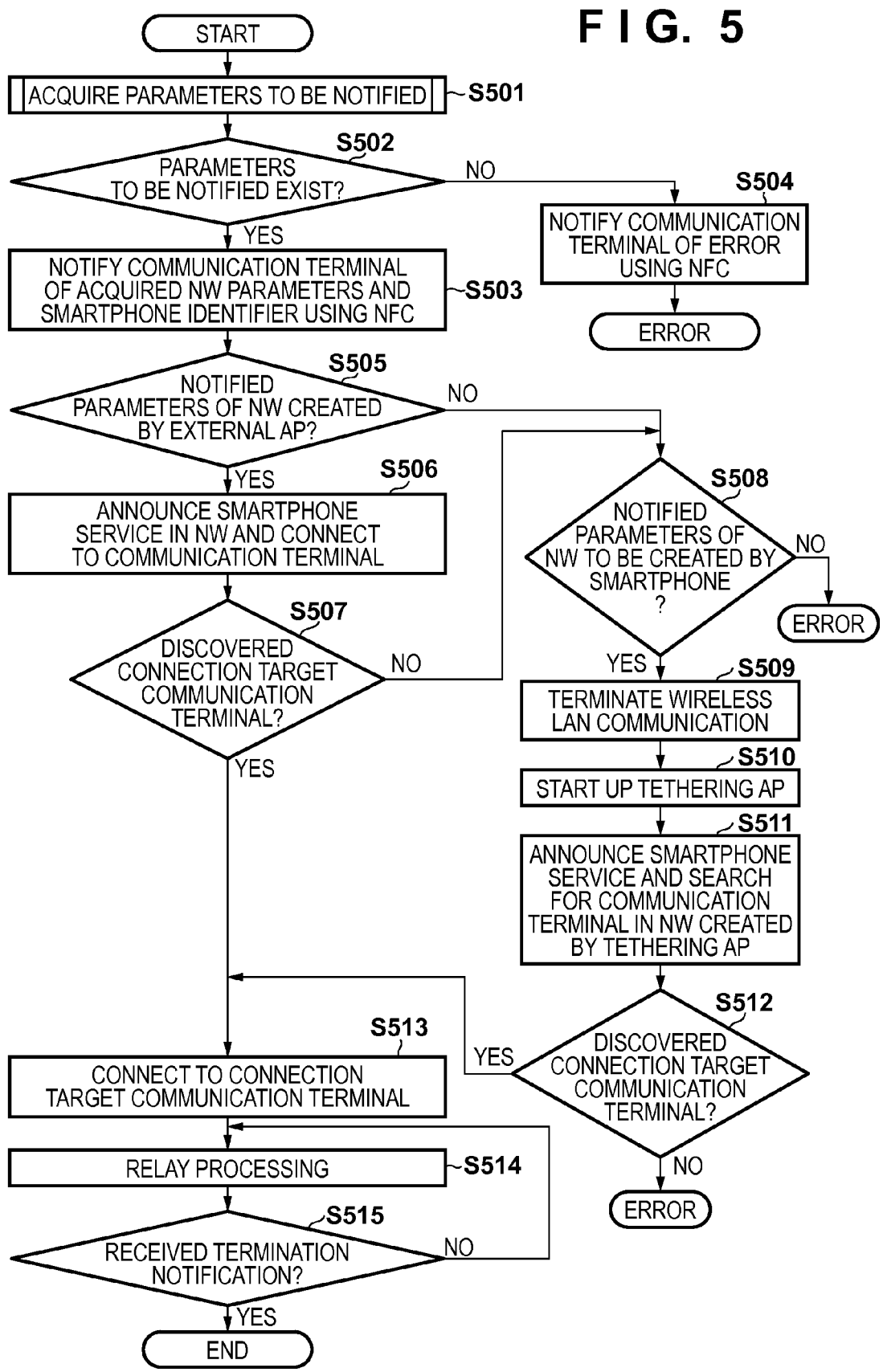
FIG. 5 is a diagram illustrating an operation flow when the relay apparatus starts communication with a communication terminal according to the first embodiment.

FIG. 5 shows an operation procedure when communication with a communication terminal (digital camera 310 or printer 311) is started by the relay apparatus (smartphone 100) of the present embodiment. In the present embodiment, this processing is carried out when the smartphone 100 operating as the relay apparatus approaches the communication terminal, and the NFC communication control unit 230 detects the proximity to the communication terminal. First, the smartphone 100 searches for and acquires the communication parameters that are to be notified of to the communication terminal (step S501). FIG. 6 is a diagram showing details of the processing of step S501. The processing of step S501 will be described below with reference to FIG. 6.

First, the smartphone 100 acquires the parameters of the network that it is connected to at the current time (the network type (wireless LAN or mobile network) and the network identifier (BSSID)), which is managed by the Internet communication management unit 260 (step S601). Next, using NFC communication via the NFC communication control unit 230, the smartphone 100 acquires the identifier of the service that the communication terminal plans to use and the communication terminal identifier from the communication terminal (step S602). If the smartphone 100 determines based on the parameters acquired in step S601 that it is connected to an external AP by a wireless LAN (Yes in step S603), the processing of steps S604 to S606 is executed.

The smartphone 100 searches the communication check table 700 for a record number 705 whose network identifier 703 and service identifier 701 match the network parameters acquired in step S601 and the service identifier acquired in step S602 (step S604). If a record number 705 having these two matching information elements exists, and the connectability 704 corresponding to the record number 705 is "Yes" (Yes in step S605), the smartphone 100 adds information regarding the network (current connected network) created by the external AP (network identifier 703 information) to the network parameters that the communication terminal is to be notified of (step S606). Next, if the mobile network communication control unit 220 determines that the smartphone 100 is in the communicable area of a mobile network (Yes in step S607), the smartphone 100 executes the processing of steps S608 to S610.

The smartphone 100 searches the communication check table 700 for a record number whose network identifier 703 is "mobile network" and whose service identifier 701 matches the service identifier acquired in step S602 (step S608). If a record number having these matching information elements exists, and the connectability 704 corresponding to that record number is "Yes" (Yes in step S609), information regarding the network to be created by the AP communication control unit 211 (tethering AP information) is added to the network parameters that the communication terminal is to be notified of (step S610).

Returning to FIG. 5, if the result of the processing of step S501 (FIG. 6) is that network parameters that the communication terminal is to be notified of exist (Yes in step S502), the smartphone 100 notifies the communication terminal of the network parameters and the identifier of the smartphone 100 (step S503). This notification is performed by NFC communication via the NFC communication control unit 230. Also, the smartphone 100 additionally notifies of information indicating whether or not the network parameters are related to a network to be created by the smartphone 100 operating as an AP, or the network created by the external AP. On the other hand, if the result of the processing of step S501 (FIG. 6) is that network parameters that the communication terminal is to be notified of do not exist (No in step S502), the smartphone 100 notifies the communication terminal of an error using NFC communication via the NFC communication control unit 230 (step S504), and ends this processing.

If network parameters related to the network created by the external AP were notified of in step S503 (Yes in step S505), the smartphone 100 decides that that wireless LAN network is to be used. The smartphone 100 then searches for the communication terminal that it performed NFC communication with in steps S501 to S503 in the wireless LAN network (step S506). More specifically, the smartphone 100 uses Simple Service Discovery Protocol (SSDP) to search for a service announced by the communication terminal, and the smartphone 100 also uses SSDP to announce service information (step S506). If a service announced by a communication terminal whose identifier corresponds to the communication terminal identifier acquired in step S602 is discovered in this network (Yes in step S507), the smartphone 100 carries out the processing from step S513 onward. If the target communication terminal is not discovered in the network created by the external AP (No in step S507), or network parameters related to the network created by the external AP were not notified of in step S503 (No in step S505), the smartphone 100 decides to start the tethering AP, and carries out the processing of steps S508 to S512.

If parameters of a network to be created by the AP communication control unit 211 were notified of in step S503 (Yes in step S508), the smartphone 100 terminates the connection with the external AP made by wireless LAN communication via the STA communication control unit 212 (step S509). If network parameters of a network to be created by the AP communication control unit 211 were not notified of in step S503 (No in step S508), the smartphone 100 ends this processing with an error. Next, the smartphone 100 starts up the access point function (tethering AP) using the AP communication control unit 211, and constructs a wireless LAN network (step S510). The smartphone 100 then performs search processing similar to step S506 in the network created in step S510 (step S511), and if the target communication terminal is discovered (Yes in step S512), the processing of step S513 onward is carried out. If the communication terminal is not discovered in step S511 (No in step S512), the smartphone 100 ends this processing with an error.

If the connection target communication terminal is discovered (Yes in step S507 or step S512), the smartphone 100 performs connection processing with the communication terminal in the wireless LAN network in which the communication terminal was discovered (step S513). The connection processing referred to here is processing for creating a logical session between the smartphone 100 and the communication terminal in relay processing that is to be carried out thereafter.

The present embodiment envisions processing in which an HTTP request for a specific URL and a response message are exchanged between the smartphone 100 and the communication terminal, but this may be substituted with connection processing performed using Transmission Control Protocol (TCP), for example.

When the connection with the communication terminal is complete, the smartphone 100 starts relay processing performed by the communication relay processing unit 250. When request messages are received from the communication terminal during the execution of this relay processing, the smartphone 100 converts the request messages into request messages corresponding to respective services, and transmits the converted request messages to the server. Similarly, when service response messages are received from the server, the smartphone 100 converts the response messages into a format corresponding to the communication protocol decided on with the partner communication terminal, and transmits the converted response messages to the communication terminal. This relay processing is continued until a termination notification message is received from the communication terminal (No in step S515). If the termination notification message is received from the communication terminal (Yes in step S515), the smartphone 100 ends the relay processing. Note that in the present embodiment, this termination notification message is an SSDP byebye message.

Next, the communication terminal of the present embodiment will be described with reference to FIGS. 8, 9, and 10. The following particularly describes an example of the case where the communication terminal is the digital camera 310.

Figure 8:
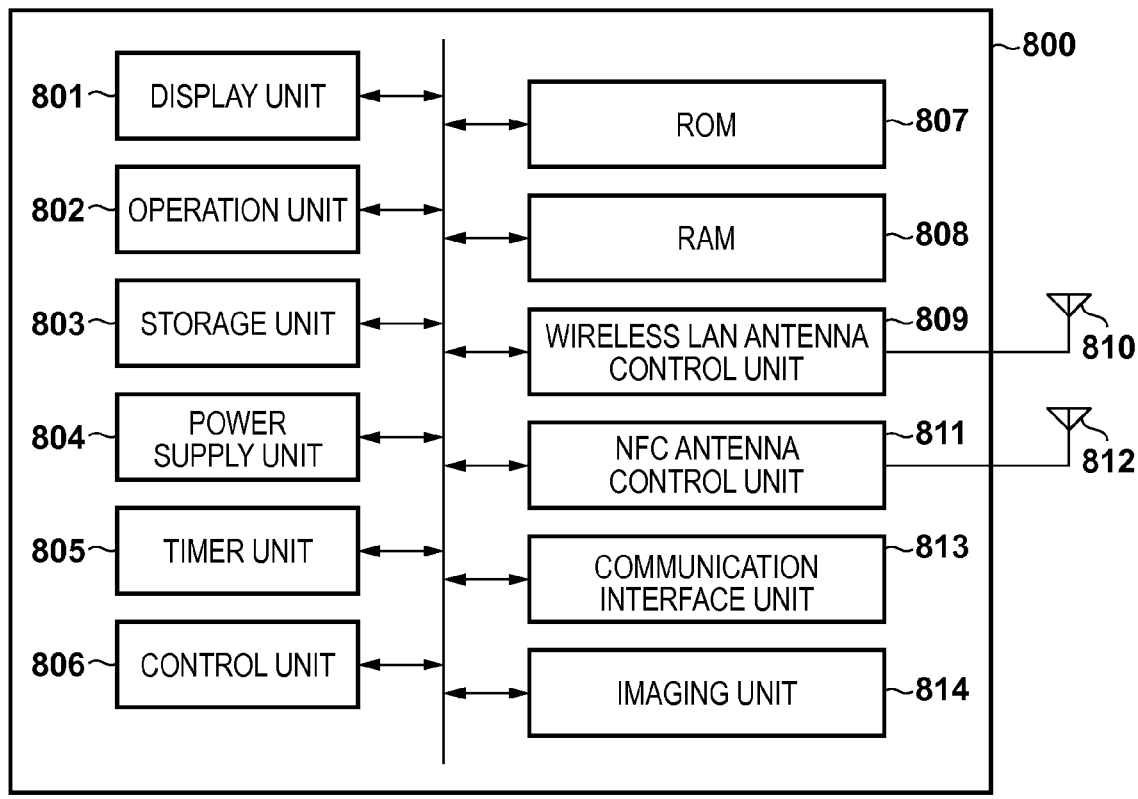
FIG. 8 is a diagram showing an example of a hardware configuration of a communication terminal according to the first embodiment.

FIG. 8 is a diagram showing the hardware configuration of a communication terminal 800 according to the present embodiment. Note that the communication terminal 800 is the digital camera 310 in the present embodiment. The communication terminal 800 includes a display unit 801, an operation unit 802, a storage unit 803, a power supply unit 804, a timer unit 805, a control unit 806, a ROM 807, a RAM 808, a wireless LAN antenna control unit 809, and a wireless LAN antenna 810. The communication terminal 800 further includes an NFC antenna control unit 811, an NFC antenna 812, a communication interface unit 813, and an imaging unit 814.

The display unit 801 and the operation unit 802 display applications and execute applications, for example. The storage unit 803 stores and manages various types of data such as wireless communication network information, data exchange information, and communication device information. The power supply unit 804 is a battery or the like. The timer unit 805 functions as a timer for measuring time. The control unit 806 is a CPU or the like, and controls operation of the constituent elements of the communication terminal 800. The ROM 807 stores control commands, that is to say, programs. The RAM 808 is used as a work memory when programs are executed, and also for the temporary storage of data, for example. The wireless LAN antenna control unit 809 controls the wireless LAN antenna 810. The NFC antenna control unit 811 controls the NFC antenna 812. The communication interface unit 813 is an interface for performing communication processing such as network searching, construction, connection, and management. The imaging unit 814 captures optical images of a subject.

Figure 9:
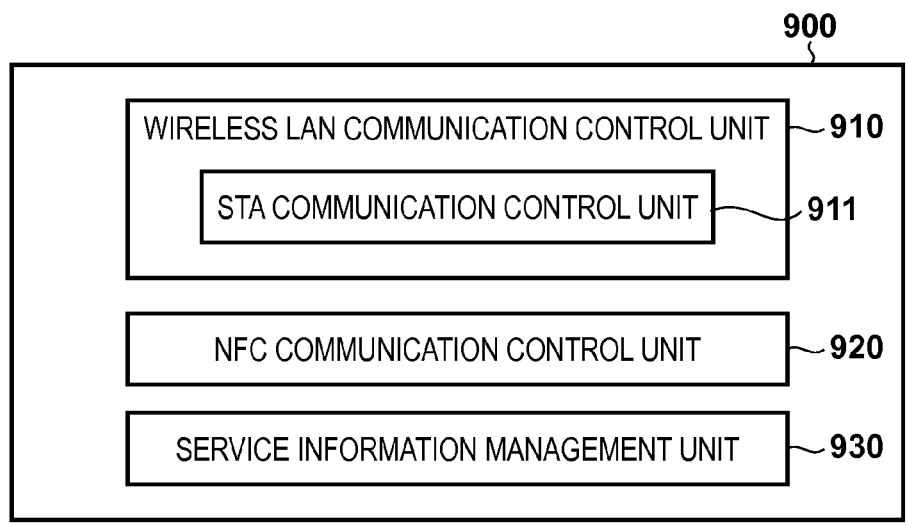
FIG. 9 is a diagram showing an example of a function block configuration of the communication terminal according to the first embodiment.
Figure 10:
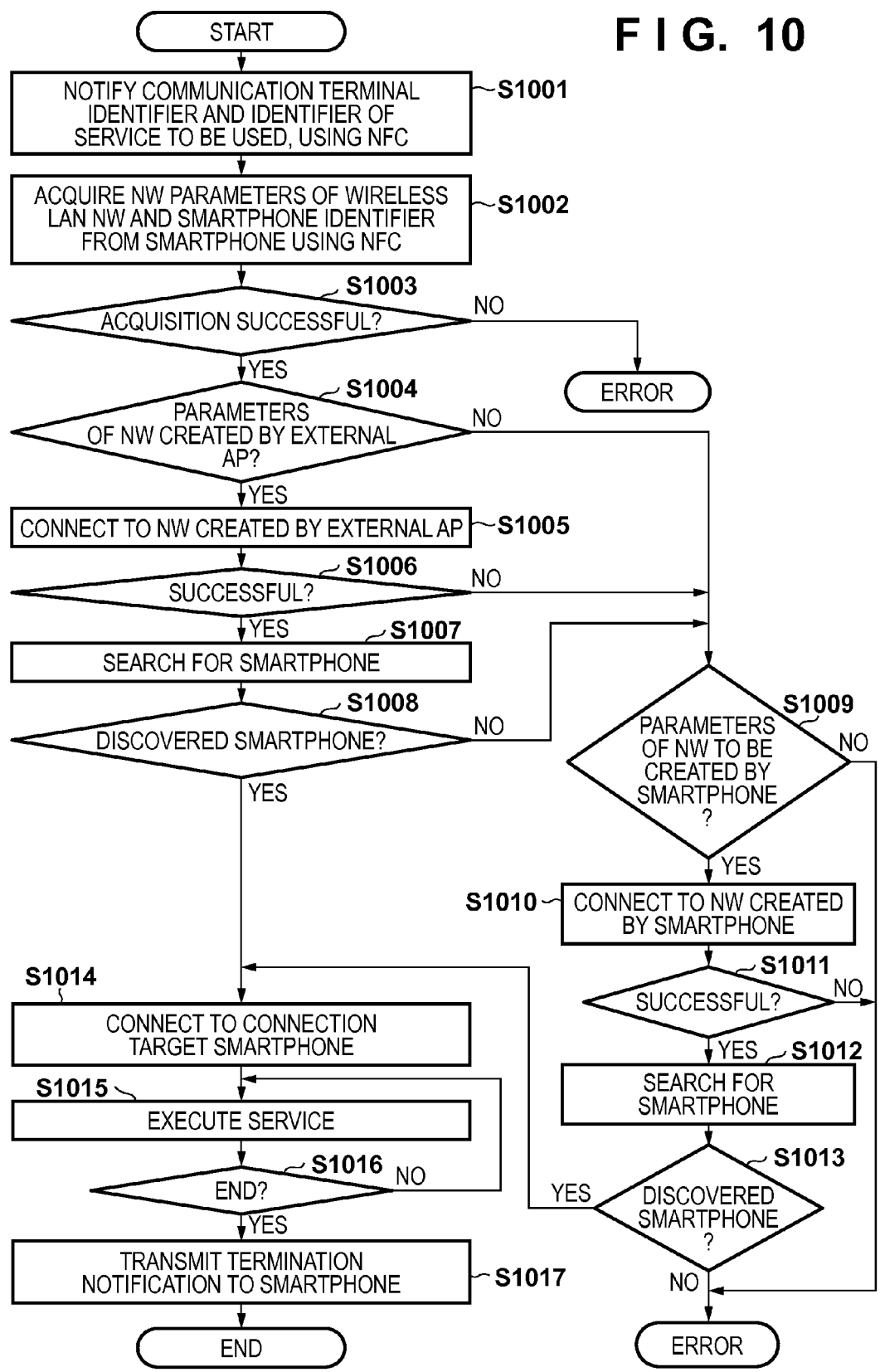
FIG. 10 is a diagram illustrating an operation flow of the communication terminal according to the first embodiment.

FIG. 9 is a function block diagram of the communication terminal of the present embodiment. In the present embodiment, the function blocks of the communication terminal 900 are stored as programs in the ROM 807, and the corresponding functions are implemented by the control unit 806 executing these programs. Note that some or all of the function blocks of the communication terminal 900 may be realized by hardware.

The communication terminal 900 includes a wireless LAN communication control unit 910, an NFC communication control unit 920, and a service information management unit 930. The wireless LAN communication control unit 910 is a processing unit that controls wireless LAN communication performed via the wireless LAN antenna 810 and the wireless LAN antenna control unit 809. Also, the wireless LAN communication control unit 210 includes an STA communication control unit 911. The STA communication control unit 911 controls wireless LAN communication performed via a connection with an external access point. The NFC communication control unit 920 controls Near Field Communication (NFC) communication performed via the NFC antenna 812 and the NFC antenna control unit 811. The service information management unit 930 manages information regarding services available to the communication terminal. The service information management unit 930 manages identifiers for one or more services available to the communication terminal.

Next, an operation procedure of the communication terminal 800 of the present embodiment will be described with reference to the flowchart of FIG. 10. The flowchart of FIG. 8 shows a procedure of operations executed in the communication terminal 800 when communication with the smartphone 100 is started. In the present embodiment, this processing is carried out when the smartphone 100 and the communication terminal 800 approach each other, and the NFC communication control unit 920 detects that communication by NFC has become possible.

First, the communication terminal 800 notifies the smartphone 100 of the identifier of the communication terminal 800 and the identifier of the service it plans to use, using NFC communication (step S1001). Subsequently, the communication terminal 800 acquires the network parameters of the wireless LAN network and the identifier of the smartphone 100 that are notified of by the smartphone 100 by NFC (step S1002). If the acquisition fails (step S1003), the communication terminal 800 ends this processing with an error. If the acquisition of these parameters is successful (Yes in step S1003), the communication terminal 800 analyzes the acquired parameters. If the acquired network parameters include network parameters for a network created by an AP other than the smartphone 100 (by an external AP) (Yes in step S1004), the communication terminal 800 attempts to make a wireless LAN communication connection to the network created by the external AP (step S1005). If the acquired network parameters do not include parameters of a network created by an external AP (No in step S1004), the communication terminal 800 executes the processing of steps S1009 to S1013.

If the connection processing of step S1005 is successful (Yes in step S1006), the smartphone 100 is searched for in the connected wireless LAN network (step S1007). More specifically, the communication terminal 800 searches for a service announced by the smartphone 100 using SSDP, as well as announces its own service information using SSDP (step S1007). If a service of a communication terminal whose identifier corresponds to the identifier of the smartphone 100 that was acquired in step S1001 is discovered in the network (Yes in step S1008), the communication terminal 800 carries out processing from step S1014 onward. If the smartphone 100 is not discovered (No in step S1008), or if the connection processing in step S1005 fails (No in step S1006), the communication terminal 800 carries out the processing of steps S1009 to S1013.

If the smartphone 100 is not discovered in the network created by the external AP (No in step S1004, S1006, or S1008), the communication terminal 800 attempts to connect to the network created by the smartphone 100 operating as an AP. If the network parameters acquired in step S1002 include parameters for a wireless LAN network created by the smartphone 100 operating as an AP (Yes in step S1009), the communication terminal 800 attempts to make a wireless LAN communication connection to that network (step S1010). If the connection processing of step S1010 is successful (Yes in step S1011), the smartphone 100 is searched for in the wireless LAN network using a method similar to that in step S1007 (step S1012). If a service of a communication terminal whose identifier corresponds to the identifier of the smartphone 100 that was acquired in step S1001 is discovered (Yes in step S1013), the communication terminal 800 carries out processing from step S1014 onward. If the smartphone 100 is not found in the network created by the smartphone 100 operating as an AP either (No in step S1009, S1011, or S1013), the communication terminal 800 ends this processing with an error.

If the smartphone 100 is discovered (Yes in step S1008 or step S1013), the communication terminal 800 performs connection processing with the smartphone 100 in the wireless LAN network in which the smartphone 100 was discovered (step S1014). Note that although the present embodiment envisions the case where this connection processing is processing in which an HTTP request for a specific URL and a response message are exchanged between the smartphone 100 and the communication terminal, this may be substituted with connection processing performed using TCP, for example. When the connection with the smartphone 100 is complete, the communication terminal 800 starts the processing of the service that the smartphone 100 was notified of in step S1001 (step S1015). Thereafter, when the service processing ends (Yes in step S1016), the communication terminal 800 transmits a termination notification message to the smartphone 100 (step S1017). Note that in the present embodiment, this termination notification message is an SSDP byebye message.

Next, an example of a communication sequence between the smartphone 100, the digital camera 310, and the server 350 shown in FIG. 3 will be described in detail with reference to FIGS. 11A to 11B and 12A to 12B.

FIGS. 11A to 11B show an example of a communication sequence in which case where, as a result of the processing shown in FIGS. 4 to 6 performed by the smartphone 100, the smartphone 100 and the digital camera 310 connect to each other via the access point 320. It is assumed here that the smartphone 100 is connected to a mobile communication network using the mobile network antenna 330.

First, the start of this sequence is triggered by the startup of an application for executing the processing of FIGS. 4 to 6 in the smartphone 100. The smartphone 100 transmits a connection check message to the server 350 via the mobile network antenna 330 (step S1101). Upon receiving a response from the server 350, the smartphone 100 stores information indicating that connection with the server 350 via the mobile communication network is possible in the communication check table 700 (step S1102). Next, the smartphone 100 connects to the network created by the access point 320 (step S1103), and then transmits a connection check message to the server 350 via the access point 320 (step S1104). Upon receiving a response from the server 350, the smartphone 100 stores information indicating that connection with the server 350 via the access point 320 is possible in the communication check table 700 (step S1105).

Next, when the digital camera 310 and the smartphone 100 are touched together (step S1106) and NFC communication is started, firstly, the digital camera 310 notifies the smartphone 100 of its own identifier and the identifier of a service it plans to use, using NFC (step S1107). Upon receiving this notification, the smartphone 100 searches the communication check table 700 (step S1108), and notifies the digital camera 310 of wireless LAN network parameters using NFC (step S1109). Here, the connection with the server 350 was confirmed by the smartphone 100 in the communication checks of both steps S1101 and S1104. Accordingly, in step S1109, the smartphone 100 notifies the digital camera 310 of both the network parameters of the network created by the access point 320 and the network parameters of the network to be created by operating as an AP. Next, the smartphone 100 starts processing for searching for the digital camera 310 using SSDP in the network created by the access point 320 (step S1110). Similarly, the smartphone 100 advertises its existence in the network created by the access point 320, using SSDP (step S1115).

Meanwhile, upon receiving the notification in step S1109, the digital camera 310 connects to the network created by the access point 320 using the notified of network parameters (step S1111). When the connection is complete, the digital camera 310 starts processing for advertising its existence in the network created by the access point 320 (step S1112), and searching for the smartphone 100 in the same network created by the access point 320 (step S1114), using SSDP. The smartphone 100 discovers the digital camera 310 (step S1113) as a result of the advertisement made in step S1112. Also, the digital camera 310 discovers the smartphone 100 (step S1116) as a result of the advertisement made in step S1115.

Next, the smartphone 100 and the digital camera 310 construct a connection mode between themselves by exchanging an HTTP request and a response message (step S1117). When the connection processing of step S1117 is complete, the smartphone 100 starts relay processing for relay between the digital camera 310 and the server 350 (step S1118). While carrying out the relay processing, the smartphone 100 converts request messages received from the digital camera 310 via the access point 320 (step S1119), and transfers the converted request messages to the server 350 via the access point 320 (step S1120). Also, upon receiving response messages from the server 350, the smartphone 100 converts the received messages and transfers them to the digital camera 310 via the access point 320. In the case of ending use of the service provided by the server 350 (step S1123), the digital camera 310 transmits a termination notification message (SSDP byebye message) to the smartphone 100 (step S1124). Upon receiving this message, the smartphone 100 stops the relay processing that was started in step S1118 (step S1125).

FIGS. 12A to 12C shows an example of a communication sequence in the case where, as a result of the processing shown in FIGS. 4 to 6 performed by the smartphone 100, the smartphone 100 operates as an AP and connects to the digital camera 310. Similarly to the case shown in FIGS. 11A and 11B, it is assumed here that the smartphone 100 is connected to a mobile communication network using the mobile network antenna 330. It is also assumed that the access point 320 is not connected to the Internet.

First, the start of this sequence is triggered by the startup of an application for executing the processing of FIGS. 4 to 6 in the smartphone 100. The smartphone 100 transmits a connection check message to the server 350 via the mobile network antenna 330 (step S1201). Upon receiving a response from the server 350, the smartphone 100 stores information indicating that connection with the server 350 via the mobile communication network is possible in the communication check table 700 (step S1202). Next, the smartphone 100 connects to the network created by the access point 320 (step S1203), and then transmits a connection check message to the server 350 via the access point 320 (step S1204). However, since the access point 320 is not connected to the Internet, the message transmitted in step S1204 does not reach the server 350. Due to not being able to receive a response from the server 350, the smartphone 100 stores information indicating that connection with the server 350 via the access point 320 is not possible in the communication check table 700 (step S1205).

Next, when the digital camera 310 and the smartphone 100 are touched together (step S1206) and NFC communication is started, firstly, the digital camera 310 notifies the smartphone 100 of its own identifier and the identifier of a service it plans to use, using NFC (step S1207). Upon receiving this notification, the smartphone 100 searches the communication check table 700 (step S1208), and notifies the digital camera 310 of wireless LAN communication parameters using NFC (step S1209). Here, only the connection with the server 350 via the mobile network antenna 330 was confirmed by the smartphone 100 in the communication checks of steps S1101 and S1104. Accordingly, in step S1209, the smartphone 100 notifies the digital camera 310 of only the parameters of the network to be created by operating as an AP. Next, the smartphone 100 terminates the connection with the access point 320 via a wireless LAN connection (step S1210), and uses its AP function to create a wireless LAN network using the parameters that the digital camera 310 was notified of in step S1209 (step S1211). The smartphone 100 then starts processing for searching for the digital camera 310 in the network created in step S1211, using SSDP (step S1212). Similarly, the smartphone 100 advertises its existence in the network created in step S1211, using SSDP (step S1217).

Meanwhile, upon receiving the notification in step S1109, the digital camera 310 connects to the network created by the smartphone 100 using the notified of network parameters (step S1213). When the connection is complete, the digital camera 310 starts processing for advertising its existence in the network (step S1214), and searching for the smartphone 100 in the same network (step S1216), using SSDP. The smartphone 100 discovers the digital camera 310 (step S1215) as a result of the advertisement made in step S1214. Also, the digital camera 310 discovers the smartphone 100 (step S1218) as a result of the advertisement made in step S1217.

Next, the smartphone 100 and the digital camera 310 construct a connection mode between themselves by exchanging an HTTP request and a response message (step S1219). When the connection processing of step S1219 is complete, the smartphone 100 starts relay processing for relay between the digital camera 310 and the server 350 (step S1220). While carrying out the relay processing, the smartphone 100 converts request messages received from the digital camera 310 via the AP communication control unit 211 (step S1221), and transfers the converted request messages to the server 350 via the mobile network antenna 330 (step S1222). Also, upon receiving response messages from the server 350, the smartphone 100 converts the received messages and transfers them to the digital camera 310 via the AP communication control unit 211.

In the case of ending use of the service provided by the server 350 (step S1225), the digital camera 310 transmits a termination notification message (SSDP byebye message) to the smartphone 100 (step S1226). Upon receiving this message, the smartphone 100 stops the relay processing that was started in step S1220 (step S1227), and also stops the AP function that was started up in step S1211 (step S1228).

Although the above is an example of a representative embodiment of the present invention, the present invention is not limited to the embodiment in this Specification and the drawings, and can be modified without departing from the spirit of the invention. Note that although the communication parameters notified of by the relay apparatus to the communication terminal are the network type and a BSSID in the above embodiment, the communication parameters are not limited in this way. For example, the communication parameters may include information such as the Service Set Identifier (SSID), the encryption type, the encryption key, and the signal strength of the wireless LAN network.

Also, although the wireless LAN network parameters that the communication terminal is notified of are limited to the parameters of the wireless LAN network that the relay apparatus is currently connected to in the above embodiment, the range of available networks may be widened. For example, the target of the search of the communication check table may be widened to networks that are in the signal reception range in the wireless LAN network search table managed in real-time in the smartphone 100.

Also, in the above embodiment there are two types of network connection modes between the relay apparatus and the communication terminal, namely the mode of connection via an external AP and the mode in which the relay apparatus operates as an AP, but other communication modes may be included. For example, Wi-Fi Direct or ad hoc connections may be included. Furthermore, communication by a method other than a wireless LAN, such as Bluetooth (registered trademark) or IrDA, may be included.

Also, although the relay apparatus uses NFC as the means for proximity communication for receiving service identifiers and the like from the communication terminal and notifying the communication terminal of communication parameters in the above embodiment, these notifications may be made using Bluetooth (registered trademark), IrDA, or the like, or by creating a temporary wireless LAN network for the notification of the communication parameters.

Also, in the above embodiment, the determination of the parameters that the communication terminal is to be notified of and the notification thereof by NFC (the processing of FIG. 5) are triggered by the NFC communication control unit 230 of the smartphone 100 detecting the approach of the communication terminal. However, the present invention is not limited to this. For example, a configuration is possible in which, when the smartphone 100 determines communicatability with the server, parameter information corresponding to the determination result is written in the NFC tag of the smartphone 100.

Specifically, in the case of determining that the server 350 can be connected to via the access point 320, the smartphone 100 writes the parameters of the network managed by the access point 320 in the NFC tag of the smartphone 100. Also, in the case of determining that the server 350 can be connected to via the mobile network antenna 330, the smartphone 100 writes the parameters of the network to be created by operating as an AP in the NFC tag of the smartphone 100. Furthermore, in the case of determining that the server 350 cannot be connected to by any method, the smartphone 100 writes error information in its NFC tag. The above processing is executed periodically, or each time the network connection mode of the smartphone 100 changes.

According to the above method, the smartphone 100 can connect to the communication terminal via an appropriate wireless LAN network without using the detection of the approach of the communication terminal as the trigger for determining the parameters that are to be notified of. In other words, according to the above method, the present invention is also applicable to a configuration in which the smartphone 100 cannot detect the approach of the communication terminal by NFC communication (or cannot start program processing using proximity detection as a trigger).

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-077258, filed Apr. 3, 2014 and 2014-223192, filed Oct. 31, 2014 which are hereby incorporated by reference herein in their entirety.

What is claimed is:

1. A communication apparatus comprising:
   a first communication unit configured to communicate with a first other communication apparatus by a first wireless communication method;
   a second communication unit configured to communicate by a second wireless communication method different from the first wireless communication method;
   a determination unit configured to determine whether it is possible to communicate with a second other communication apparatus via communication with the first other communication apparatus by the first wireless communication method and/or it is possible to communicate with the second other communication apparatus via communication by the second wireless communication method; and
   a providing unit configured to provide, to a third other communication apparatus, either first communication parameters for connecting to the communication apparatus or second communication parameters for connecting to the first other communication apparatus based on a determination result by the determination unit.

2. The communication apparatus according to claim 1, further comprising a relay unit configured to relay communication between the third other communication apparatus and the second other communication apparatus when the providing unit provides the first communication parameters.

3. The communication apparatus according to claim 1, wherein in the first other communication apparatus is an access point.

4. The communication apparatus according to claim 1, wherein the second communication unit communicates in a mobile network.

5. The communication apparatus according to claim 1, wherein the determination unit determines whether it is possible to communicate with the second other communication apparatus based on whether the communication apparatus has at least either one of a gateway server address and a Domain Name Service (DNS) server address.

6. The communication apparatus according to claim 1, wherein the determination unit determines whether it is possible to communicate with the second other communication apparatus by a Dynamic Host Configuration Protocol (DHCP) protocol being assigned.

7. The communication apparatus according to claim 1, wherein the determination unit determines whether it is possible to communicate with the second other communication apparatus by the communication apparatus being connected to an access point to which an external apparatus is connected.

8. The communication apparatus according to claim 1, further comprising a receiving unit configured to receive service information from the third other communication apparatus,
   wherein the providing unit provides, in response to receiving of the service information of the receiving unit, the first communication parameters or the second communication parameters to the third other communication apparatus.

9. The communication apparatus according to claim 1, wherein the determination unit determines whether it is possible to communicate with another communication apparatus providing the service via communication with the first other communication apparatus by the first wireless communication method and/or it is possible to communicate with the another communication apparatus via communication by the second wireless communication method.

10. The communication apparatus according to claim 1, wherein the providing unit provides the first communication parameters or the second communication parameters by performing communication using any of Near Field Communication (NFC), Bluetooth, and IrDA.

11. The communication apparatus according to claim 10, further comprising a communication control unit configured to, in a case where the providing unit performs communication by NFC, write a parameter that corresponds to a determination result obtained by the determination unit in an NFC tag.

12. A method of controlling a communication apparatus having a first communication unit configured to communicate with a first other communication apparatus by a first wireless communication method and a second communication unit configured to communicate by a second wireless communication method different from the first wireless communication method, comprising:
  determining whether it is possible to communicate with a second other communication apparatus via communication with the first other communication apparatus by the first wireless communication method and/or it is possible to communicate with the second other communication apparatus via communication by the second wireless communication method; and
  providing, to a third other communication apparatus, either first communication parameters for connecting to the communication apparatus or second communication parameters for connecting to the first other communication apparatus based on a determination result in the determining.

13. A non-transitory computer-readable storage medium storing a computer program for controlling a computer to execute a method of controlling a communication apparatus having a first communication unit configured to communicate with a first other communication apparatus by a first wireless communication method and a second communication unit configured to communicate by a second wireless communication method different from the first wireless communication method, the method comprising:
  determining whether it is possible to communicate with a second other communication apparatus via communication with the first other communication apparatus by the first wireless communication method and/or it is possible to communicate with the second other communication apparatus via communication by the second wireless communication method; and
  providing, to a third other communication apparatus, either first communication parameters for connecting to the communication apparatus or second communication parameters for connecting to the first other communication apparatus based on a determination result in the determining.

* * * * *